US009035609B1

(12) United States Patent  
Kim et al.

(10) Patent No.: US 9,035,609 B1  
(45) Date of Patent: May 19, 2015

(54) HOT SWAP CONTROL IN UNINTERRUPTIBLE POWER SUPPLY

(75) Inventors: Sangsun Kim, San Jose, CA (US); Craig Kaneshiro, San Jose, CA (US); William Dailey, Redwood City, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 13/588,174

(22) Filed: Aug. 17, 2012

Related U.S. Application Data

(60) Provisional application No. 61/590,060, filed on Jan. 24, 2012.

(51) Int. Cl.
*H02J 7/02* (2006.01)
*H02J 7/00* (2006.01)

(52) U.S. Cl.
CPC .............. *H02J 7/0042* (2013.01); *H02J 7/0045* (2013.01)

(58) Field of Classification Search
USPC ......................................................... 320/111
See application file for complete search history.

(56) References Cited

U.S. PATENT DOCUMENTS

| 5,216,286 | A | 6/1993 | Peterson |
| 5,488,531 | A * | 1/1996 | Aldridge et al. ................ 361/18 |
| 5,764,032 | A | 6/1998 | Moore |
| 6,903,533 | B1 * | 6/2005 | Geren et al. .................. 320/134 |
| 7,245,469 | B2 | 7/2007 | Nemoto et al. |
| 7,432,617 | B2 | 10/2008 | Kanouda et al. |
| 8,432,136 | B2 * | 4/2013 | Ashida .......................... 320/152 |
| 2001/0033502 | A1 | 10/2001 | Blair et al. |
| 2002/0136042 | A1 | 9/2002 | Layden et al. |
| 2005/0036253 | A1 | 2/2005 | Tian et al. |
| 2005/0043859 | A1 | 2/2005 | Tsai et al. |
| 2007/0075684 | A1 | 4/2007 | Liu et al. |
| 2007/0109708 | A1 | 5/2007 | Hussman et al. |
| 2008/0265682 | A1 | 10/2008 | Huang et al. |
| 2009/0009005 | A1 | 1/2009 | Luo et al. |
| 2009/0072623 | A1 | 3/2009 | Liao |
| 2010/0013312 | A1 | 1/2010 | Groff et al. |
| 2010/0237828 | A1 | 9/2010 | Maegawa |
| 2011/0095727 | A1 | 4/2011 | Yeh et al. |
| 2011/0260544 | A1 | 10/2011 | Imai et al. |
| 2012/0068541 | A1 | 3/2012 | Anderson |
| 2013/0187471 | A1 | 7/2013 | Kim et al. |

FOREIGN PATENT DOCUMENTS

| JP | 09308134 A | 11/1997 |
| JP | 2007306662 A | 11/2007 |

OTHER PUBLICATIONS

International Search Report & Written Opinion dated May 15, 2013 for Application No. PCT/US2013/022458.
International Search Report & Written Opinion dated Apr. 25, 2013 for Application No. PCT/US2013/022039.

* cited by examiner

*Primary Examiner* — Eric Lee (74) *Attorney, Agent, or Firm* — Lerner, David, Littenberg, Krumholz & Mentlik, LLP (57) ABSTRACT

Aspects relate generally to hot swap control in uninterruptible power supply units for systems requiring backup power. A unit may include a pair of MOSFET switches configured as a bidirectional switch for battery charging and discharging current control. This configuration allows the unit to limit inrush current when the unit is connected to a DC power bus of a power system and also allows the unit to eliminate any current flow when it is disconnected. Upon insertion and extraction of the unit, the MOSFET switches are disabled to prevent any disturbances on the DC power bus. Hot swapping in the unit ensures that the overall power system, including the unit and the DC bus, operates reliably.

17 Claims, 7 Drawing Sheets

HOT SWAP CONTROL IN UNINTERRUPTIBLE POWER SUPPLY

CROSS-REFERENCE TO RELATED APPLICATION

The present application claims the benefit of the filing date of U.S. Provisional Patent Application No. 61/590,060 filed Jan. 24, 2012, the disclosure of which is hereby incorporated herein by reference.

BACKGROUND

Various systems utilize battery backup supply systems, such as uninterruptible power supply ("UPS") units. The UPS units include batteries that are charged during periods when the system is being powered by an external power source. If the power source is lost, the batteries are used to power the system's load. A typical system may use two different power supplies, one to run the components (such as devices in a server array) and another to charge the batteries. In addition, when the UPS unit is hot swapped, or connected and disconnected from a live power source (such as a DC distribution bus or DC bus), significant mating and demating current potentially cause mechanical failure in the power connectors of the power supply and the UPS unit. In addition, significant inrush current flowing through the batteries may produce high di/dt and dv/dt, disturb the DC bus, and negatively impact the overall system performance.

SUMMARY

Aspects of the disclosure provide an uninterruptible power supply unit. The uninterruptible power supply unit includes a battery pack and a pair of MOSFET switches. The pair of MOSFET switches includes a first MOSFET switch and a second MOSFET switch connected in series to the battery pack. The uninterruptible power supply also includes a power connector having three pins. Two pins of the three pins being longer than the third pin. The two longer pins are configured to deliver current from a power source to the uninterruptible power supply unit. The uninterruptible power supply unit also includes a short pin detector in communication with the third pin. The short pin detector is configured to detect whether the third pin is connected to the power source. The uninterruptible power supply unit also includes a protection circuit in communication with the short pin detector such that only when the short pin detector detects that the third pin is connected to the power source does the protection circuit allow the uninterruptible power supply unit to activate first MOSFET switch in order to limit the inrush current from the power source through the first MOSFET switch.

In one example, the uninterruptible power supply unit also includes a transistor in communication with the protection circuit and the pair of MOSFET switches, and the protection circuit allows current to be delivered from the power source to the battery pack by sending a signal through the transistor to switch the second MOSFET switch from an off condition to the activated condition. In another example, uninterruptible power supply unit also includes a controller for controlling charging of the battery pack by limiting the charging current through the first MOSFET switch when the first MOSFET switch is operating in a linear region. In this example, the transistor is a NPN transistor. In another example, uninterruptible power supply unit also includes a transistor in communication with the protection circuit and the MOSFET switch, and the protection circuit is configured to allow current to be delivered from the power source to the battery pack by sending a signal through the transistor to activate the first MOSFET switch in order to allow a limited amount current to be delivered from the power source to charge the battery pack. In this example, the protection circuit is configured to send a signal through the transistor to switch the pair of MOSFET switches to the off condition to stop the flow of current from the power source through the two longer pins when the short pin detector detects that the third pin is disconnected from the power source and before the two longer pins are disconnected from the power source. In yet another example, the second MOSFET switch is connected in series with the first MOSFET switch, and the first MOSFET switch and the second MOSFET switch are configured to operate as a bidirectional switch. In this example, the first MOSFET switch and the second MOSFET switch are further configured for charging the battery pack, discharging the battery pack, and disconnecting the battery pack from the power source.

Another aspect of the disclosure provides a method of charging a battery pack. The method includes connecting two pins of a power connector having three pins to a power supply. The two pins are longer than the third pin. The two longer pins are configured to deliver current from a power supply to the battery pack. The method also includes detecting, by a short pin detector, whether the third pin is connected to the power source. The method includes, when the third pin is connected to the power source, transmitting a signal through a transistor to a switch in order to switch the switch from an off condition to an activated condition in order to provide the charging current from the power source through the two longer pins to charge the battery pack. The method also includes limiting the charging current through the switch when the switch is in the activated condition.

In one example, the method also includes, after transmitting the signal, limiting the charging current by operating the switch in a linear region. In another example, the method also includes, when third pin is disconnected from the power source, transmitting a second signal through the transistor to switch the switch to the off condition thereby stopping the flow of current from the power source through the two longer pins to the battery pack before the two longer pins are disconnected from the power source. In another example, the switch is a MOSFET switch.

A further aspect of the disclosure provides a system. The system includes a power source for providing current and an uninterruptible power supply unit. The uninterruptible power supply unit includes a battery pack, a MOSFET switch connected in series to the battery pack, and a power connector having three pins. Two pins of the three pins being longer than the third pin. The two longer pins are configured to deliver current from a power source to the uninterruptible power supply unit. The uninterruptible power supply unit also includes a short pin detector in communication with the third pin. The short pin detector is configured to detect whether the third pin is connected to the power source. The uninterruptible power supply unit also includes a protection circuit in communication with the short pin detector such that only after the short pin detector detects that the third pin is connected to the power source does the protection circuit allow the uninterruptible power supply unit switch the MOSFET to an activated condition and to limit the charging current from the power source through the MOSFET in order to charge the battery pack.

In one example, the uninterruptible power supply unit also includes a transistor in communication with the protection circuit and the MOSFET switch, and the protection circuit allows current to be delivered from the power supply to the battery by sending a signal through the transistor to switch the MOSFET switch from an off condition to the activated condition. In this example, the uninterruptible power supply unit also includes a controller for limiting the charging current through the MOSFET switch when the MOSFET switch is operating in a linear region. In addition or alternatively, the transistor is a NPN transistor. In another example, the uninterruptible power supply unit further comprises a transistor in communication with the protection circuit and the MOSFET switch transistor. In this example, the protection circuit is also configured to allow current to be delivered from the power supply to the battery by sending a signal through the transistor to switch the MOSFET switch from an off condition to an activated condition in order to allow current to be delivered from the DC bus to charge the two or more batteries, and, when the short pin detector detects that the third pin is disconnected from the power source, the protection circuit is also configured to send a signal through the transistor to switch the MOSFET switches to the off condition stopping the flow of current from the power bus through the two longer pins before the two longer pins are disconnected from the power source. In another example, power supply includes a DC power bus.

DETAILED DESCRIPTION

The configurations described herein disclose a UPS unit that supports hot swapping without disturbing the DC distribution bus, thus providing a reliable back up power system. For example, by utilizing two metal-oxide semiconductor field effect transistors ("MOSFET") switches in series as a bi-directional switch, the MOSFET switches may act as a disconnect device when disconnecting the battery pack of the UPS unit from the DC bus. The UPS unit may have a three pin blind mating connector. Two of the pins may include power pins, the third pin may be somewhat shorter than the power pins. Upon connection of a UPS unit with a DC bus, a short pin detector senses when the short pin is connected to the DC bus. Before the short pin is completely connected, but after the power pins establish contacts, the MOSFET switches remain turned off so that current from the DC bus does not flow to the battery pack. When the short pin is completely connected to the DC bus, the MOSFET switches are activated under charging conditions and begin limiting the charging current at a predetermined level to prevent very high inrush current during the insertion (and extraction) of the UPS unit. If the battery voltage is higher than the DC bus voltage, the discharging MOSFET may be immediately turned off by the protection circuit.

Upon extraction of UPS unit from the DC bus, the short pin disengages from the DC bus before the power pins are disconnected. When the short pin loses the contact, the MOSFET switches are immediately turned off so that no charging and discharging current (i.e., demating current) flow is allowed at the time of the power pin removal. This allows for safe removal and connection of the UPS unit from the DC bus. Thus, the MOSFET switches may allow for hot swapping, charging and discharging in a single circuit configuration. In this configuration, neither a separate battery charger (or backup converter) nor a separate hot swapping circuit are needed.

Figure 1:
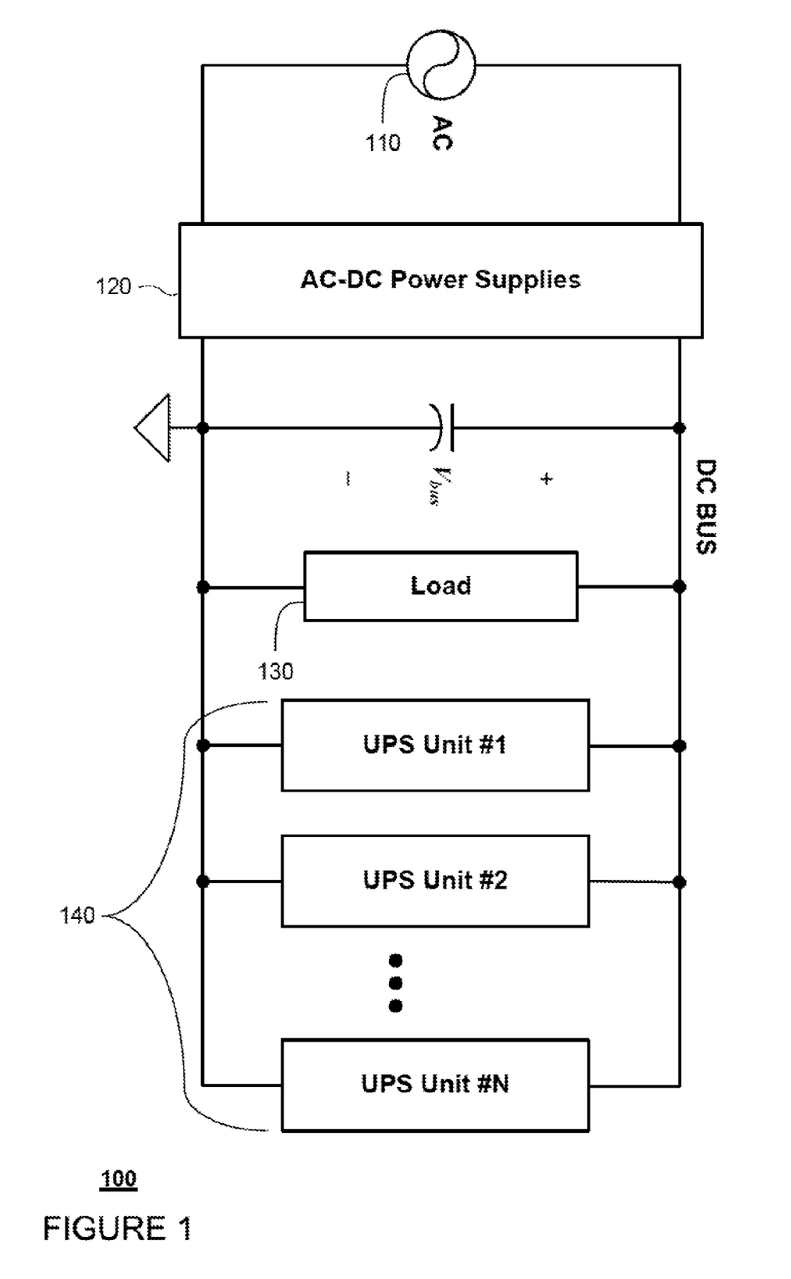
FIG. 1 is an example diagram of power architecture in accordance with implementations of the disclosure.

FIG. 1 is an example of a distributed power architecture 100 for a server system having a load and a plurality of UPS units 140. In this example, the architecture includes an AC power source 110 that supplies power to AC-DC power supplies 120. The AC-DC power supplies 120 provide power to a load 130. In this example, the load 130 may include a plurality of computing components.

The AC-DC power supplies 120 are also connected to the plurality of UPS units 140. As shown in FIG. 1, the UPS units 140 are arranged on a common DC distribution bus in parallel with the AC-DC power supplies 120 and the load 130. The UPS units 140 are used to ensure continued operation of the load 130 in the event of a failure of the AC power source 110 and/or AC-DC power supplies 120. The number of UPS units (N) used in the system may be determined based on the amount of backup power required to power the load for some pre-determined period of time.

Figure 2:
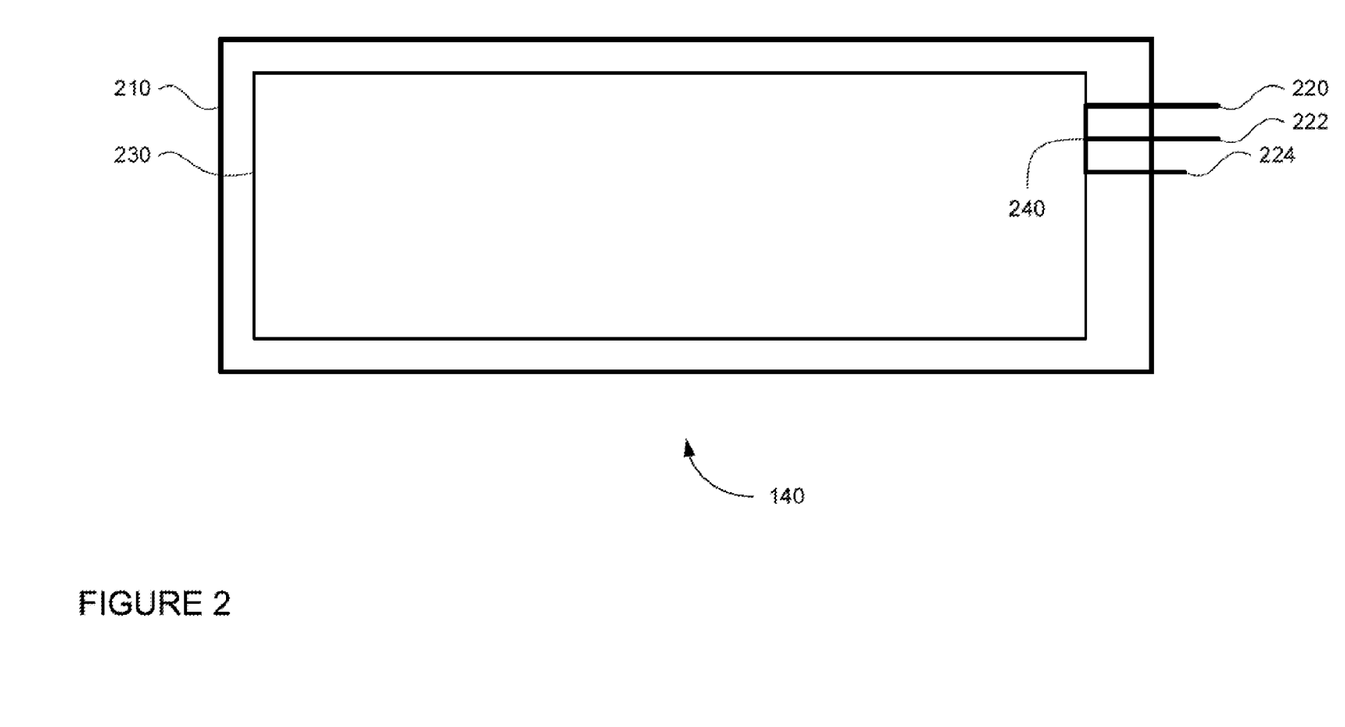
FIG. 2 is a diagram of a UPS unit in accordance with implementations of the disclosure.

FIG. 2 is an example of a UPS unit 140. In this example, the UPS unit 140 includes a housing 210, a connector 240 having power terminals 220, 222, 224 to receive power from the AC-DC power supplies 120, as well as driving circuitry 230. Terminals 220 and 222 may include power pins that provide power from the DC bus to the UPS unit. Terminal 224 may include a third pin, shorter than the power pins.

Figure 3:
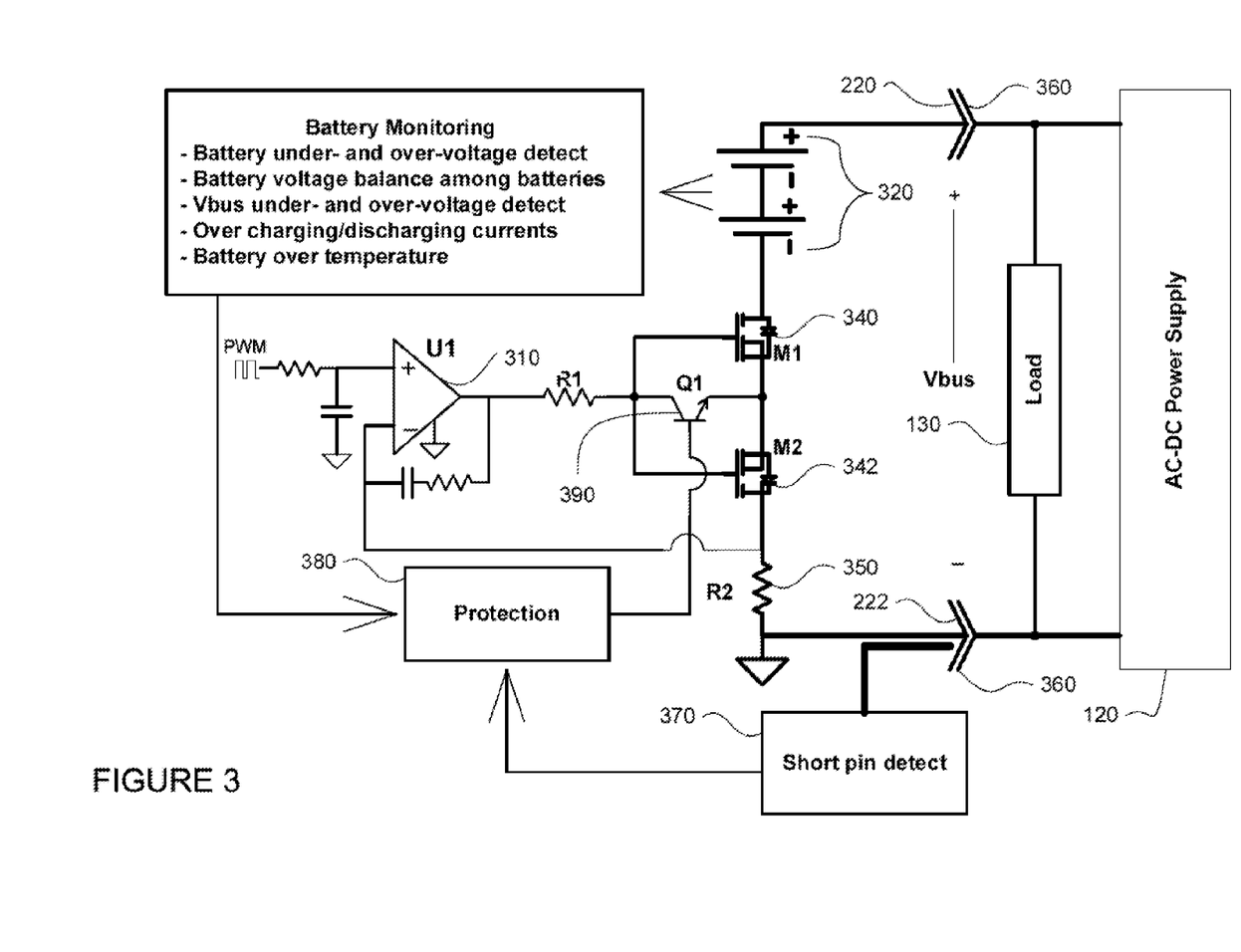
FIG. 3 is an example diagram of circuits of UPS units in accordance with implementations of the disclosure.

FIG. 3 is an example of driving circuitry that may be used with the UPS unit 140. In this examples, the driving circuitry includes a controller 310, a battery pack 320 having one or more batteries, switches 340 and 342, a feedback device 350, and a short pin detector 370. In addition, these circuits may also include a protection circuit 380 and a transistor 390 for fast off switching of the switches 340 and 342 based on temperature, voltage and current information associated with the batteries. As shown in these examples, the battery pack 320, the switches 340 and 342, and the feedback device 350 are arranged in series with one another.

The switches 340, 342 desirably comprise MOSFET switches. MOSFET switches are used to supply current for battery charging and discharging. The MOSFET SWITCHES have different modes of operation. For example, a MOSFET have a switched mode of operation, including a "fully off" condition and a "fully on" condition. Another mode of operation is a linear region of operation where the drain-to-source voltage and the drain current can be regulated by adjusting gate-to-source voltage. In this example, when operating in the linear region, the MOSFET allows a gate-to-source voltage of between 0 and 12 volts to pass through the MOSFET's gate. Whether a MOSFET are used as switches or in operated in their linear mode depends on whether the batteries are being charged (linear operation), discharged (on), or disconnected (off) from the load and the AC power supply.

The pair of MOSFET switches may be used for both the charging and discharging of the batteries. For example, MOSFET switch 340 can be used to control the charging of the batteries while MOSFET switch 342 can be used for discharging of the batteries. This combination of a charging MOSFET and a discharging MOSFET allows operation as a bidirectional switch.

The protection circuit 380 may be configured to turn off and on both MOSFET switches 340 and 342 in order to disconnect or connect the battery pack 320 from the DC bus. The protection circuit 380 may include a microcontroller, CPU, or any type of circuit that can sense the condition of the current, temperature or voltage of the battery. If one or more of these conditions is outside of a predetermined normal operating range (for example, operating at an abnormal voltage, current, and/or temperature), the protection circuit 380 may automatically switch the MOSFET switches 340 and 342 to the off condition disconnecting the UPS from the AC-DC power supply and the load. The protection circuit may operate much faster to shut off the MOSFET switches than the controller.

In addition to monitoring the current, temperature, and voltage of the batteries of the battery pack, the protection circuit 380 may also receive information from a short pin detector 370. The short pin detector may include a circuit that produces a high or low signal (for example, 0 or 1) to the protection circuit when the short pin is engaged with the DC bus. Based on this information, the protection circuit may switch on or off the MOSFET switches through the transistor 390.

Figure 4A:
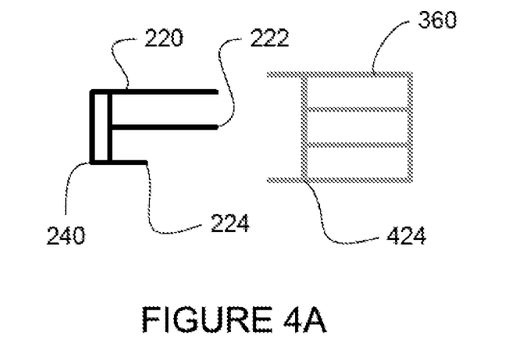
FIGS. 4A-4C are example diagrams of connectors in accordance with an implementation of the disclosure.
Figure 4B:
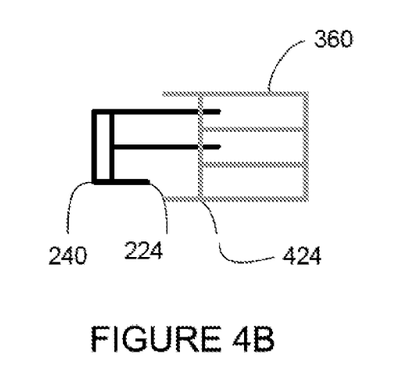

For example, the UPS unit may be placed on a battery shelf in the rack. The connector 240 of the UPS unit is lined up with the blind mating connector 360 of the DC bus (or some other connection to the DC bus). As shown in FIG. 4A, as the connectors 240 and 360 approach one another, the two long power pins 220, 222 may reach connector 422 first. As shown in FIG. 4B, as the connectors are moved closer together, the two long power pins 220, 222 make contact with connector 360 (as indicated by their placement past reference line 424 in FIG. 4B) before the short pin 224. Thus, even though the two long power pins are connected to the DC bus connector, the charging and discharging MOSFET switches may remain in the deactivated condition so that no current flows through the MOSFET switches.

Figure 4C:
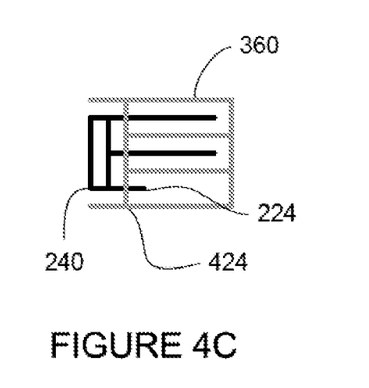

Eventually, after a few milliseconds, the UPS unit connector and the DC bus connector will be fully engaged. For example, as shown in FIG. 4C the short pin 224 may pass reference line 424 and mate with the connector 360. In response to this connection, the short pin connector may send a signal to second protection circuit, indicating that the short pin is connected. For example, once the short pin detector 370 detects that the short pin 224 is connected to the DC bus connector 360, a signal is sent to the protection circuit 380.

The protection circuit may respond by detecting the status of the batteries and the DC bus via the feedback device 350. For example, protection circuit 380 may monitor the battery and DC bus voltages to determine whether these voltages are acceptable to charge and discharge the battery. The protection circuit 380 also receives information about the battery temperatures and currents to determine if they are acceptable.

If no fault or conditions outside of the predetermined normal operating range are detected, the UPS unit is ready for operation and the protection circuit activates the MOSFET switches through transistor 390 under charging conditions in order to begin the charging of the battery pack 320. In this regard, the UPS unit may allow charging current to flow through the batteries only when the connectors between the UPS unit and the DC bus are fully engaged. For example, rather than switching the MOSFET switches to a fully on condition, the MOSFET switches are activated so that they operate in the linear region in order to provide charging current to the battery pack. This prevents significant inrush current from flowing through the battery pack and prevents damage to the UPS unit and the DC bus. When the MOSFET switches are operated in the linear region, the charging current may be limited by the MOSFET switches to a very low level, as described below, in order to not disturb the DC bus.

The controller 310 controls the charging of the battery pack. The controller 310 may be, in one example, an amplifier configured to receive information from the feedback device. Based on the received information, the controller is able to automatically transition the UPS unit from using an outside power source to charge the battery to supplying power to a load. The feedback device 350 can include a shunt or current sense resistor that senses current from one of the power pins 220 and sends it to the negative terminal of the controller 310.

The controller automatically detects the state of the bus voltage based on current feedback received from the feedback device 350. For example, when the DC bus voltage is greater than the battery voltage, the controller is in charging mode. In the charging mode, the controller regulates or limits the charging current through the charging MOSFET, MOSFET switch 340, by adjusting the gate-to-source voltage of the MOSFET switch 340 based on current received from the feedback device 350. In one example, the controller 310 is desirably associated with a reference current value. This value can be set through a pulse-width modulation (PWM) signal 360 at the positive terminal of the controller 310. In some examples, the reference charging current value is set very low in comparison to the discharging current needed to power the load. By using a relatively low charging current, the thermal stress on the charging MOSFET operating in the linear region is low as well. If the current through the charging MOSFET is too high, the MOSFET can heat up and fail. This can also reduce the power drain on the AC-DC power supplies 120.

The controller compares the reference current value and the information from the feedback device, and adjusts the current through the MOSFET 340 in order to control the charging of the battery pack 320. The charging current feedback at the negative terminal, received from the feedback device 350, follows the current defined at the positive terminal in voltage.

When the charging current becomes a bit lower than the reference current value, the DC bus voltage will be very close to or the same as the battery voltage. At this point, the battery may be almost fully charged. In response to current feedback from the current sense device, the output of the controller may be saturated at the maximum gate voltage and the battery is float charged to keep the battery close to or at its fully charged level.

As noted above, the control circuitry 230 can also be used for discharging. If the power source 110 and/or AC-DC power supplies 120 fail, the power received at the terminals 220, 222 of the UPS unit will drop off. The DC bus voltage will be less than the battery voltage. This causes the charging current feedback to be significantly lower than the reference current value. The difference between the charging current feedback and the reference current value causes the controller's output to go into saturation and causes the MOSFET switches to go into the fully on condition. In other words, the MOSFET switches are no longer operating in the linear region. At this point, the controller is no longer controlling the charging of the battery pack 320, and the current from the battery pack can discharge and flow through the terminals 220 to power the load 130. Having the MOSFET switches in the fully on condition when the battery pack is discharging can also reduce conduction loss.

The battery pack can continue to discharge until the battery pack is fully discharged or until the power source 110 and/or AC-DC power supplies 120 have been restored. When the power source has been restored, the UPS unit can automatically transition from discharging to charging via the controller.

Returning to the example of FIG. 3, when the power from the AC-DC power supplies 120 is restored, the charging current feedback causes the controller 310 to immediately limit the charging current to the battery pack as described above.

When the UPS unit is extracted from the rack, the short pin may disengage from the DC bus connector before the two long power pins. After a gap of a few milliseconds, the two long power pins may also disengage from the DC bus connector. During this few millisecond gap, the short pin detector 370 may send a signal to the protection circuit 380. In response, the protection circuit may immediately turn off the charging and discharging MOSFET switches through transistor 390. Thus, the MOSFET switches are turned off before the two long power pins are disengaged from the DC bus connector.

The currents that flow through the batteries during the mating and demating of the connectors may be reduced or eliminated by the detection of the status of the short pin, the battery pack, and the DC bus voltage. Significant current during the mating and demating may cause mechanical failure at the connectors. The short pin, short pin detector, protection circuit, and charging MOSFET may simplify the hot swap control of the batteries. This configuration may eliminate the need for separate hot swapping circuitry as the hot swapping control is integrated into the UPS unit's connection to the DC bus. This may also allow for efficient switching of the charging and discharging MOSFET switches, whereas the controller 310 may not be fast enough to deactivate the MOSFET switches. Accordingly, the UPS unit may be hot swapped without risking damage to the UPS unit or other features of the system 100.

Figure 5:
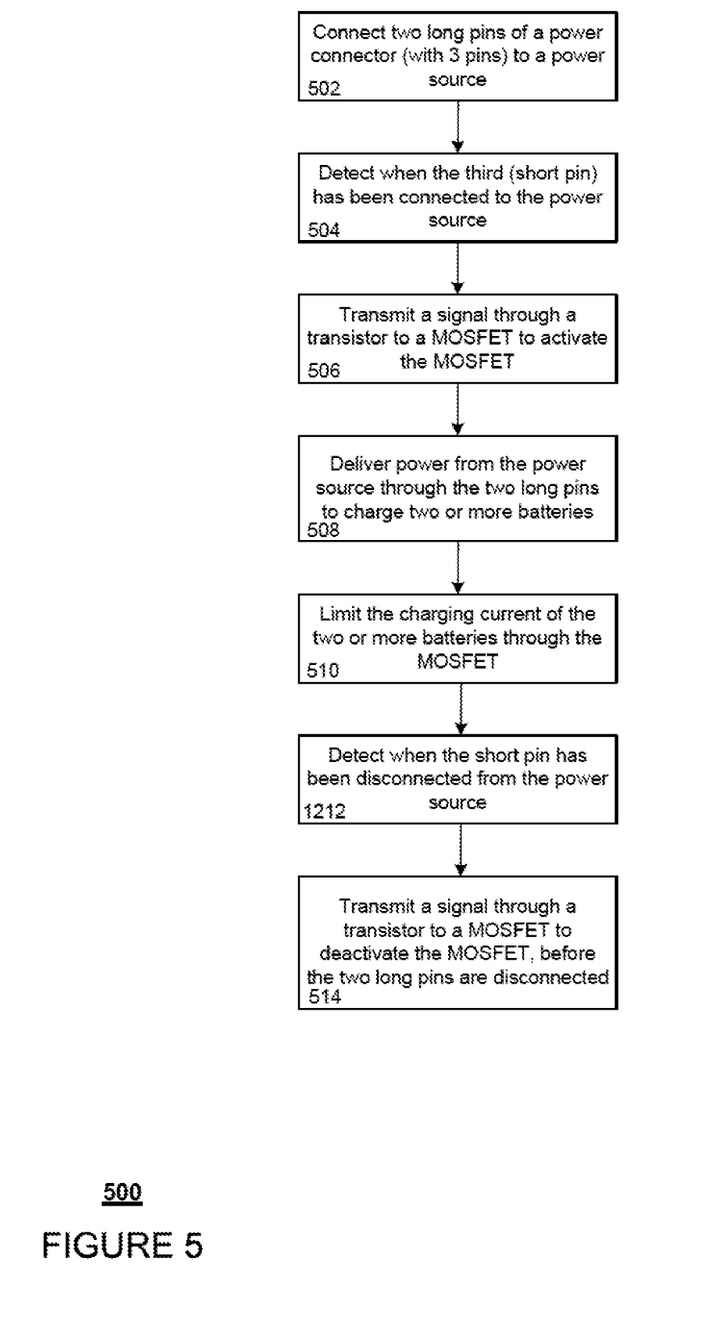
FIG. 5 is an example flow diagram in accordance with implementations of the disclosure.

Flow diagram 500 of FIG. 5 depicts an example of the hot swapping and short pin detection process described above. For example, at block 502, the two long power pins of a connector are connected to a power supply. The short pin detector detects when the short pin has been connected to the power source at block 504. In response, a signal is transmitted through a transistor 390 in order to switch a MOSFET switch to an activated condition at block 506. Power from the power source is then delivered through the two long power pins in order to charge the batteries at block 508. Next, at block 510, the charging current of the batteries is then limited through the MOSFET as described above. As the UPS unit is removed from the rack, the short pin detector detects when the short pin has been disconnected from the power supply at block 512. In response, a signal is transmitted through the transistor 390 in order to switch the MOSFET to the deactivated condition at block 514. This stops the current flow through the MOSFET to the batteries and ends the charging and the discharging of the two or more batteries.

Figure 6A:
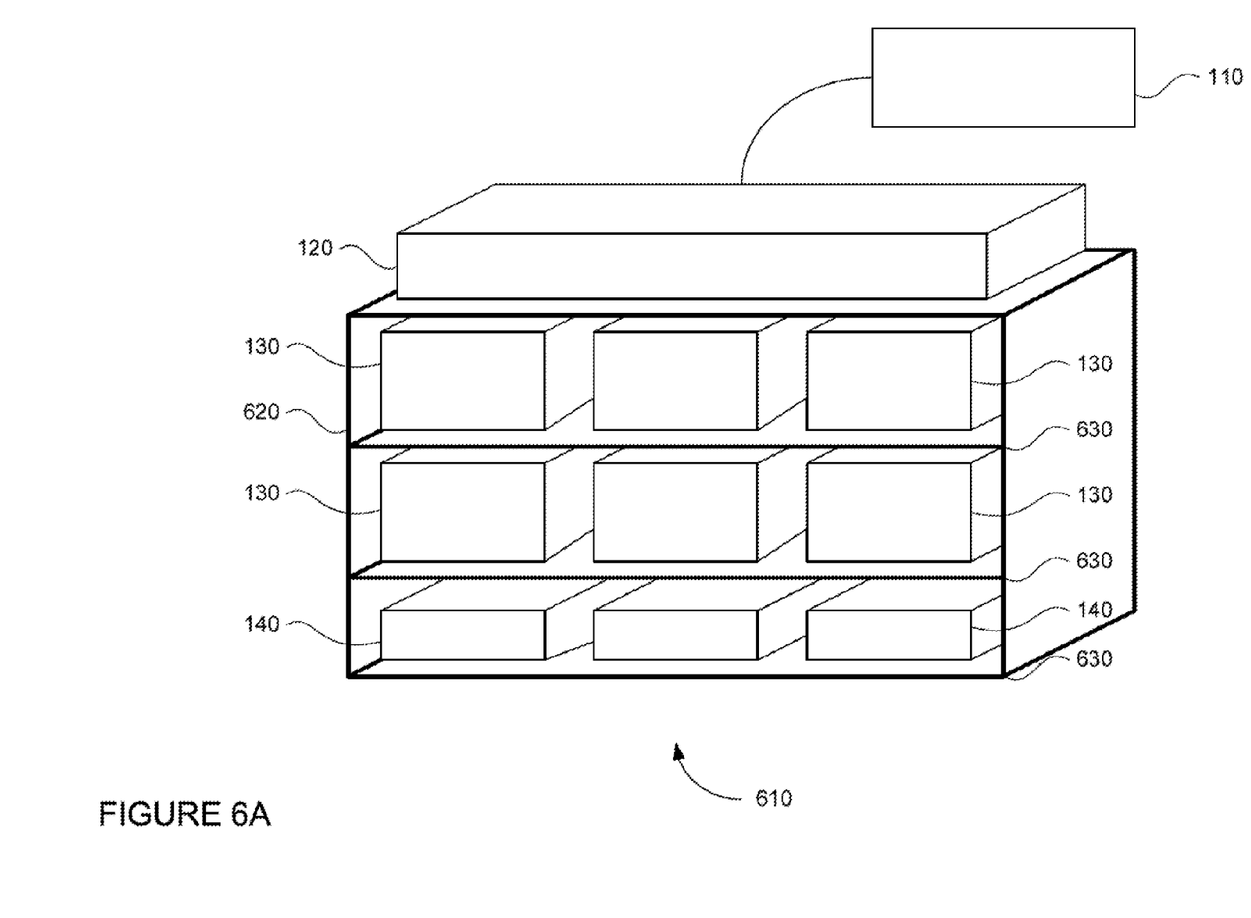
FIG. 6A is an example of a server architecture in accordance with implementations of the disclosure.

The UPS units described herein can be used in conjunction with various backup power systems. For example, these devices may be useful in telecom systems or server architectures. FIG. 6A is an example of a server architecture including a plurality of the UPS units described herein. In this example, the server 610 includes a rack 620, having a set of shelves 630, for housing the load 130 as well as the UPS units 140. The AC-DC power supplies 120 can be incorporated into the rack 610 (as shown in FIG. 6A) or can be at a different location, for example, as the AC power source 110 is shown in FIG. 6A.

The load 130 can include a variety of devices. For example, the load 130 can include a dedicated storage device, for example, including any type of memory capable of storing information accessible by a processor, such as a hard-drive, memory card, ROM, RAM, DVD, CD-ROM, or solid state memory. The load may include a preprogrammed load which draws power from the AC-DC power supplies 120 in order to test the operation of the server 610. The load 130 may also include a computer including a processor, memory, instructions, and other components typically present in server computers.

Figure 6B:
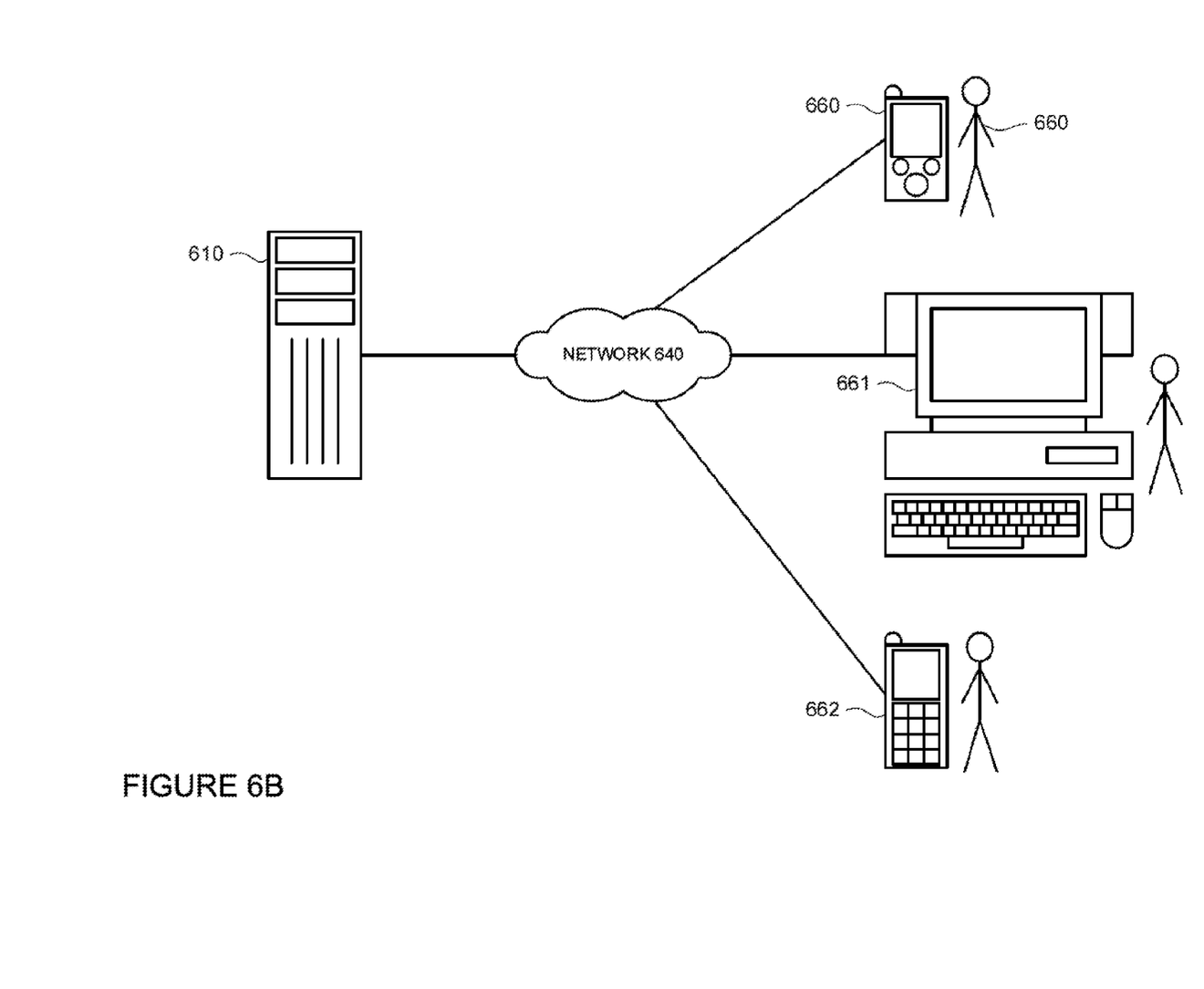
FIG. 6B is an example of a network system architecture in accordance with implementations of the disclosure.

FIG. 6B is an example of a network system including the server architecture of FIG. 6A. For example, server 610 may be at one node of a network 640 and capable of directly and indirectly communicating with other nodes of the network. For example, these computers may exchange information with different nodes of a network for the purpose of receiving, processing and transmitting data to one or more client devices 660-62 via network 640. In this regard, server 610 may transmit information for display to user 660 on display of client device 660. In the event of a failure of the AC power source 110, the UPS units may allow the server 610 to continue communications with the other nodes without interruption.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. An uninterruptible power supply unit comprising:
    a battery pack;
    a pair of MOSFET switches, including a first MOSFET switch and a second MOSFET switch, connected in series to the battery pack;
    a power connector having three pins, two pins of the three pins being longer than the third pin, the two longer pins being configured to deliver current from a power source to the uninterruptible power supply unit;
    a short pin detector in communication with the third pin, the short pin detector being configured to detect whether the third pin is connected to the power source; and
    a protection circuit in communication with the short pin detector such that only when the short pin detector detects that the third pin is connected to the power source does the protection circuit allow the first MOSFET switch to be activated in order to limit the inrush current from the power source through the first MOSFET switch.

2. The uninterruptible power supply unit of claim 1, further comprising a transistor in communication with the protection circuit and the pair of MOSFET switches, and wherein the protection circuit allows current to be delivered from the power source to the battery pack by sending a signal through the transistor to switch the second MOSFET switch from an off condition to the activated condition.

3. The uninterruptible power supply unit of claim 2, wherein the transistor is a NPN transistor.

4. The uninterruptible power supply unit of claim 1, further comprising a controller for controlling charging of the battery pack by limiting the charging current through the first MOSFET switch when the first MOSFET switch is operating in a linear region.

5. The uninterruptible power supply unit of claim 1, further comprising:
   a transistor in communication with the protection circuit and the MOSFET switch; and
   wherein the protection circuit is configured to allow current to be delivered from the power source to the battery pack by sending a signal through the transistor to activate the first MOSFET switch in order to allow a limited amount of current to be delivered from the power source to charge the battery pack, and
   wherein the protection circuit is configured to send a signal through the transistor to switch the pair of MOSFET switches to the off condition to stop the flow of current from the power source through the two longer pins when the short pin detector detects that the third pin is disconnected from the power source and before the two longer pins are disconnected from the power source.

6. The uninterruptible power supply unit of claim 1, wherein the second MOSFET switch is connected in series with the first MOSFET switch, and the first MOSFET switch and the second MOSFET switch are configured to operate as a bidirectional switch.

7. The uninterruptible power supply unit of claim 6, wherein the first MOSFET switch and the second MOSFET switch are further configured for charging the battery pack, discharging the battery pack, and disconnecting the battery pack from the power source.

8. A method of charging a battery pack, the method comprising:
   connecting two pins of a power connector having three pins to a power supply, the two pins being longer than the third pin, the two longer pins being configured to deliver current from a power supply to the battery pack;
   detecting, by a short pin detector, whether the third pin is connected to the power source;
   when the third pin is connected to the power source, transmitting a signal through a transistor to a switch in order to switch the switch from an off condition to an activated condition in order to provide the charging current from the power source through the two longer pins to charge the battery pack; and
   limiting the charging current through the switch when the switch is in the activated condition.

9. The method of claim 8, further comprising, after transmitting the signal, limiting the charging current by operating the switch in a linear region.

10. The method of claim 8, further comprising when third pin is disconnected from the power source, transmitting a second signal through the transistor to switch the switch to the off condition thereby stopping the flow of current from the power source through the two longer pins to the battery pack before the two longer pins are disconnected from the power source.

11. The method of claim 8, wherein the switch is a MOSFET switch.

12. A system comprising:
a power source for supplying current; and
an uninterruptible power supply unit comprising:
   a battery pack,
   a MOSFET switch connected in series to the battery pack;
   a power connector having three pins, two pins of the three pins being longer than the third pin, the two longer pins being configured to deliver current from the power source to the uninterruptible power supply unit;
   a short pin detector in communication with the third pin, the short pin detector being configured to detect whether the third pin is connected to the power source; and
   a protection circuit in communication with the short pin detector such that only after the short pin detector detects that the third pin is connected to the power source does the protection circuit allow the uninterruptible power supply unit switch the MOSFET switch to an activated condition and to limit charging current from the power source through the MOSFET switch in order to charge the battery pack.

13. The system of claim 12, wherein the uninterruptible power supply unit further comprises a transistor in communication with the protection circuit and the MOSFET switch, and wherein the protection circuit allows current to be delivered from the power source to the battery by sending a signal through the transistor to switch the MOSFET switch from an off condition to the activated condition.

14. The system of claim 13, wherein the uninterruptible power supply unit further comprises a controller for limiting the charging current through the MOSFET switch when the MOSFET switch is operating in a linear region.

15. The system of claim 13, wherein the transistor is a NPN transistor.

16. The system of claim 12, wherein the uninterruptible power supply unit further comprises a transistor in communication with the protection circuit and the MOSFET switch transistor, and wherein:
   the protection circuit is further configured to allow current to be delivered from the power source to the battery pack by sending a signal through the transistor to switch the MOSFET switch from an off condition to an activated condition in order to allow current to be delivered from the power supply to charge the battery pack, and
   when the short pin detector detects that the third pin is disconnected from the power source, the protection circuit is configured to send a signal through the transistor to switch the MOSFET switches to the off condition stopping the flow of current from the power bus through the two longer pins before the two longer pins are disconnected from the power source.

17. The system of claim 12, wherein the power source includes a DC power bus.

* * * * *